United States Patent [19]
Locher et al.

[11] Patent Number: 5,940,033
[45] Date of Patent: Aug. 17, 1999

[54] APPARATUS, METHODS AND COMPUTER PROGRAM FOR EVALUATING MULTIPLE NULL FORMING ANTENNA PROCESSORS AND JAMMERS

[75] Inventors: Robert J. Locher, Ocean; Cynthia E. Burtis, Point Pleasant; David P. McAvoy, Pt. Pleasant Beach; Edward F. Rodman, Neptune Township, all of N.J.

[73] Assignee: The United States of America as represented by the Secretary of the Army, Washington, D.C.

[21] Appl. No.: 09/009,512

[22] Filed: Jan. 20, 1998

[51] Int. Cl.$^6$ ................................ G01S 3/16; G01S 3/28
[52] U.S. Cl. ............................................. 342/378; 342/19
[58] Field of Search .................................... 342/417, 378, 342/379, 16, 19

[56] References Cited

U.S. PATENT DOCUMENTS 5,579,016  11/1996  Wolcott et al. ......................... 342/378

OTHER PUBLICATIONS

Torrieri, Donald J., *Principle of Secure Communications*, Norwood, MA, Artech House, 1985.
Jordan, Edward C., *Electromagnetic Waves and Radiating Systems*, New York, Prentice–Hall, 1950.
Gabriel, William F., "Adaptive Arrays—An Introduction", 64 *Proceedings of (IEEE)*, No. 2, pp. 239–272, Feb. 1976.
"Using Spectral Estimation Techniques in Adaptive Processing Antenna Systems," *IEEE Transactions on Antennas and Propagation*, vol. AP–34, No. 3, Mar. 1986.

*Primary Examiner*—Theodore M. Blum
*Attorney, Agent, or Firm*—Michael Zelenka; George B. Tereschuk

[57] ABSTRACT

An automated interactive antenna patterning apparatus depicts adaptive array antenna patterns and selects adaptive antenna array characteristics. The apparatus comprises an antenna modeling means building an adaptive antenna description, representing a number of antenna elements, means for determining angle-of-arrival, means for rank-ordering, means for sorting, means for antenna patterning and data output means providing composite antenna patterns for each array receiver. The adaptive antenna patterning apparatus better determines adaptive null steering antenna patterns produced in the presence of numerous interference sources. Also, automated interactive antenna patterning methods provide for depicting adaptive array antenna patterns and selecting adaptive antenna array characteristics, comprising the steps of forming an adaptive antenna description, determining angle-of-arrival, rank-ordering interference peaks, building a nulling table in a sorting means, calculating a total interference signal level and a signal to noise ratio plus interference ratio for each array receivers, forming an antenna pattern at the receivers, applying each pattern to determine nulled interference signal-to-noise level at each receiver and providing a data output means with the composite antenna pattern for each receiver. A computer-readable medium whose contents cause a computer system to depict adaptive antenna array characteristics as an article of manufacture is also provided.

35 Claims, 8 Drawing Sheets

INPUTS 1<i<(M-n) WHERE THERE ARE M+1 ELEMENTS IN THE ARRAY

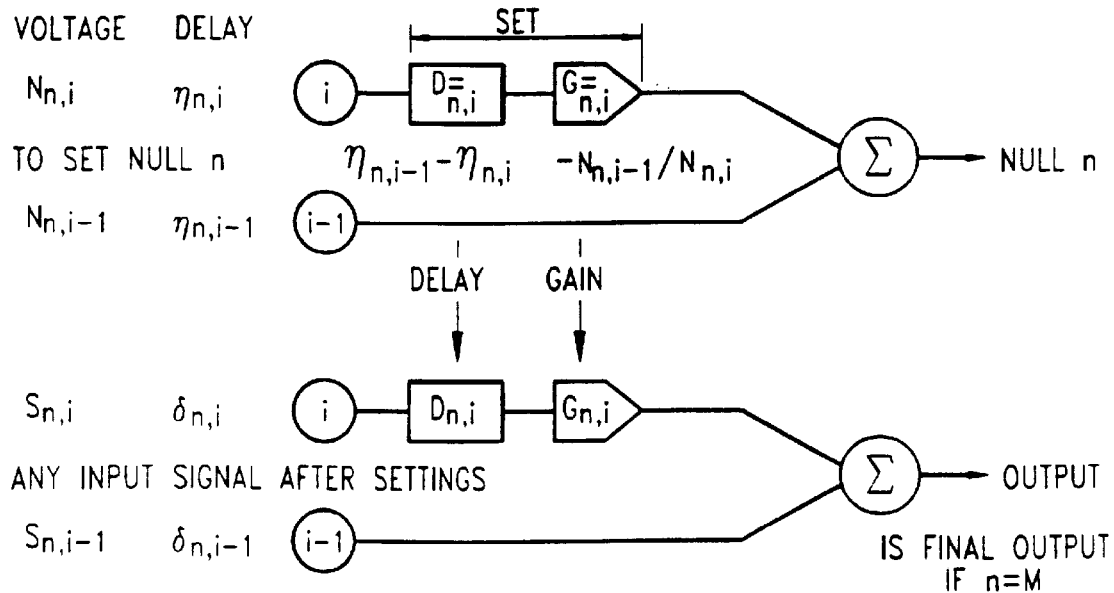

IF n<M, OUTPUT IS $\begin{cases} S_{n+1,i-1} \\ \delta_{n+1,i-1} \end{cases}$ BECOMES $\begin{cases} N_{n+1,i-1} \\ \eta_{n+1,i-1} \end{cases}$ TO SET n+1 NULL

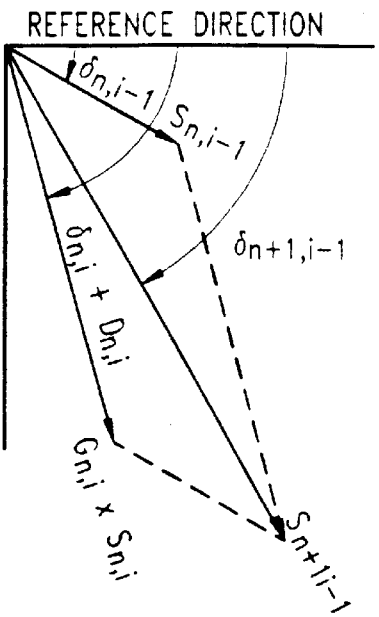

REFERENCE DIRECTION $V_1 = G_{n,i} \times S_{n,i} \sin(\delta_{n,i} + D_{n,i}) + S_{n,i-1} \sin \delta_{n,i-1}$ $V_2 = G_{n,i} \times S_{n,i} \cos(\delta_{n,i} + D_{n,i}) + S_{n,i-1} \cos \delta_{n,i-1}$ VOLTAGE OUT $S_{n+1,i-1} = \left| \left[ V_1^2 + V_2^2 \right]^{\frac{1}{2}} \right|$ DELAY OUT $\delta_{n+1,i-1} = \left[ \cos^{-1}\left( \frac{V_2}{S_{n+,i-1}} \right) \right] \times \frac{V_1}{|V_1|}$

FIG. 5

APPARATUS, METHODS AND COMPUTER PROGRAM FOR EVALUATING MULTIPLE NULL FORMING ANTENNA PROCESSORS AND JAMMERS

GOVERNMENT INTEREST

The invention described herein may be manufactured, used and licensed by or for the Government of the United States of America without the payment to us of any royalties thereon.

BACKGROUND OF THE INVENTION

1. Field of the Invention

This invention relates in general to the field of Radio Frequency Interference (RFI) and Communications Electronic Warfare (EW). More particularly, this invention relates to automated interactive adaptive antenna patterning apparatus, methods and computer programs for modeling and evaluating performance of adaptive null steering antenna systems considered to be operating in the presence of a given number of interference sources.

2. Description of the Prior Art

Adaptive array antennas, interference cancelers and sidelobe cancelers produce different antenna patterns in different electromagnetic environments. In the past, it has been difficult to evaluate the requirements for, or performance of, antenna and processor systems without a specific model of a particular system. Generally, antenna models are limited to single applications, complicated and costly to develop and do not have sufficient flexibility needed for design engineering studies. For example, an engineer could not use previous models to determine whether additional or fewer nulls would be effective in a design. Understanding antenna patterns is particularly important in the area of electronic countermeasures and jamming.

To predict the performance of adaptive array antennas, the antenna's pattern must be determined, which depends on factors such as the antenna's physical characteristics and the number of independent incoming RF signals that the antenna "sees." A resulting Signal-to-Noise ratio (S/N) must also be calculated. Furthermore, currently available antenna models have to be embedded in a scenario model in order to truly reflect system performance and require the operator to evaluate one link at a time. Prior art antenna models suffer from the drawbacks and limitations of being too specific or unique, and being unable to determine optimum null quantity limited to one link at a time.

Those concerned with the antenna performance and design parameters have long recognized the need for an economical and flexible means of evaluating the performance of the adaptive array antenna. This would allow the designer to define the expected environment, have the flexibility needed for design engineering studies, do cost trade-off analyses and accurately predict the formation of the antenna pattern under different conditions and scenarios.

The present invention fulfills those long-recognized needs without suffering from the drawbacks, disadvantages and limitations of prior art antenna models by providing automated interactive adaptive antenna patterning apparatus, methods and computer programs which better predict adaptive array antennas' behavior, allowing the designer to inexpensively and economically utilize numerous adaptive array antenna characteristics and many scenarios as data inputs, without requiring costly single application models. The present invention allows a designer to evaluate the optimum number of nulls in a given scenario and to determine if using unengaged tracking loops to maximize the desired signal provides improved performance. Not only does the present invention overcome the drawbacks and disadvantages of prior art antenna models, it also provides both superior fidelity in modeling Graham-Schmidt processors by not canceling prior nulls and the additional flexibility of defining the upper limits of null depths rather than assuming a fixed percentage of canceled capability. The preferred embodiment of the apparatus and an article of manufacture of the present invention, provides a computer program known as the Jammer Scenario Effects Assessment Model (JAMSEAM).

In general, the adaptive antenna patterning apparatus of the present invention, contemplates an antenna modeling means building an adaptive antenna description, representing a number of antenna elements, a means for determining angle-of-arrival, a means for rank-ordering, a means for sorting, a means for antenna patterning and a data output means that provides a composite antenna pattern for each of the array's receivers. The adaptive antenna patterning apparatus can better determine adaptive null steering antenna patterns produced in the presence of numerous interference sources.

In general, the methods of the present invention, encompass the steps of forming an adaptive antenna description, determining angle-of-arrival, rank-ordering interference peaks, building a nulling table in a sorting means, calculating a total interference signal level and a signal to noise ratio plus interference ratio for each of the array's receivers, forming an antenna pattern at the receivers, applying each pattern to determine nulled interference signal-to-noise level at each receiver and providing a data output means with the composite antenna pattern for each receiver. The computer program disclosed and claimed as an article of manufacture operates in a manner similar to the apparatus.

In addition to analyses of adaptive array antennas, the apparatus, methods and computer programs of the present invention would be extremely useful to predict the behavior of interference cancelers, side-lobe cancelers and single element antennas in various signal environments. Potential uses include predicting performance of potential enhancement antennas for the Mobile Subscriber Equipment (MSE) and other military applications, as well as designing new antennas, evaluating the use of existing antennas in specific customer applications, antenna performance evaluation, network planning, antenna enhancement trade-off analyses, signal interference assessment and battlefield survivability.

General references in the field of antenna performance analysis include:

Torrieri, Donald J., *Principle of Secure Communications*, Norwood, Mass., Artech House, 1985; and Jordan, Edward C., *Electromagnetic Waves and Radiating Systems*, New York, Prentice-Hall, 1950.

Examples of adaptive array antenna processors may be found in the following references:

Gabriel, William F., "Adaptive Arrays—An Introduction", 64 *Proceedings of (IEEE)*, Number 2, pp. 239–272, February 1976.

"Using Spectral Estimation Techniques in Adaptive Processing Antenna Systems," *IEEE Transactions on Antennas and Propagation*, Volume AP-34, Number 3, March 1986.

SUMMARY OF THE INVENTION

It is an object of the present invention to provide automated patterning apparatus, methods and computer programs for determining the antenna pattern produced by an adaptive null steering antenna in the presence of at least one interference source.

It is a further object of this invention to provide an adaptive patterning apparatus, methods and computer programs comprising an adaptable mechanism for determining the antenna pattern produced by a selected adaptive array antenna, interference cancelers and side-lobe cancelers. These patterns as well as entered passive antenna patterns are used to predict the performance of antenna systems networks or single links employing adaptive array antennas.

It is an additional object of the apparatus, methods and computer programs of the present invention to automatically determine antenna patterns produced by a selected adaptive null steering antenna in the presence of at least one interference source in user-defined electronic environments with user-selected inputs.

To attain these and other objects, the present invention contemplates an automated interactive antenna patterning apparatus for depicting adaptive antenna array patterns and selecting adaptive antenna array characteristics, comprising an antenna modeling means producing an antenna description, representing a number of antenna elements, the modeling means resolving interference signals according to angle-of-arrival and signal level for receivers within the antenna description, an angle-of-arrival determination means to calculate angles of arrival of the interference signals, a sorting means forming a nulling table to solve two terminal inputs, a rank-ordering means to calculate the array's interference signal peaks, a nulling table application means, a nulled interference means, a means for using unengaged tracking loops to either renull the strongest interference signal or maximize the desired signal, an antenna patterning means, applying said antenna patterns to determine the nulled interference signal-to-noise level at the array's receivers and a data output means providing a composite antenna pattern output for each of said receivers. One embodiment of the apparatus discloses a computer program for automatically determining antenna null patterns in accordance with the present invention.

Additionally, the present invention also contemplates automated methods for depicting, and evaluating adaptive array antenna patterns and selecting adaptive antenna array characteristics comprising the steps of forming an adaptive antenna description with selected parameters, resolving a plurality of interference signals seen by the antenna description, transmitting the array to an angle-of-arrival determination means, calculating angles of arrival of the interference signals, providing a prenulled Signal-to-Noise ratio to a rank-ordering means, rank-ordering interference signals according to angle of arrival and signal level at each receiver, constructing a nulling table in a sorting means, calculating a total interference signal level and a signal-to-noise plus interference ratio, S/(N+I), reducing said plurality of interference signals by applying nulls to incoming signals representing signal gain and delay factors, forming and applying antenna patterns to determine a nulled interference signal-to-noise ratio for each of said receivers, and providing a composite antenna data pattern output of the array. One of the automated methods disclosed utilizes a computer program.

The present invention also encompasses a computer-readable medium for automatic antenna array patterning as an article of manufacture.

BRIEF DESCRIPTION OF THE DRAWINGS

Other features and details of the present invention will become apparent in light of the Detailed Description of the Invention and the following accompanying figures.

FIG. 5 depicts how time of flight delay and amplitude are calculated.

TABLE I is an example of an antenna single link performance report.

TABLE II is an example of an antenna network performance report.

It should be apparent to one skilled in the art that the terms used in this application have clear meaning in the field and are well-known. These terms include delay, gain, nulling, Gram-Schmidt process, tracking loop node and platform.

The term "delay" as used throughout this specification should be considered to refer to the time required to put the two signals into time coincidence.

The term "gain" as used throughout this specification should be considered to refer to the power ratio that makes the two signals equal and opposite in sign so that their sum produces a null.

The term "nulling" as used throughout this specification should be considered to refer to the process of taking a second independent sample of a wave front, phase shifting it by 180° and summing it with the first sample, and that definition is equally applicable to this application where the desire is to provide multiple nulls using a Gram-Schmidt process.

The term "Gram-Schmidt process" as used throughout this specification should be considered to refer to the process of forming multiple nulls where each new null is formed on top of all previously formed nulls. Each new null, which is essentially a null vector, is orthogonal to all previously formed null vectors.

The term "tracking loop" as used throughout this specification should be considered to refer to a feed back circuit that adjusts the delay such that the result of the output from the summing junction is a minima resulting in the formation of a null or a maxima resulting in the formation of an adaptive antenna lobe.

The term "node" as used throughout this specification should be considered to refer to the end of a link. A link is terminated by a node at each end. A node may be composed of one or more single radios, cellular phones, repeaters, switches or computer terminals and any combination of gateways or routes, bridges and computer terminals. A node is identified with a unique designation.

The term "platform" as used throughout this specification should be considered to refer to a source of interference for a given location. For example, a soldier, a vehicle and a helicopter, each having a radio are considered platforms. A platform may contain any number of transmitters and will be designated with a unique identification.

These definitions should apply in conjunction with any other commonly accepted definitions of those terms. The exact nature of this invention as well as other objects and advantages thereof will be readily apparent from consideration of the following specification relating to the annexed drawings.

DETAILED DESCRIPTION OF THE INVENTION

Figure 1:
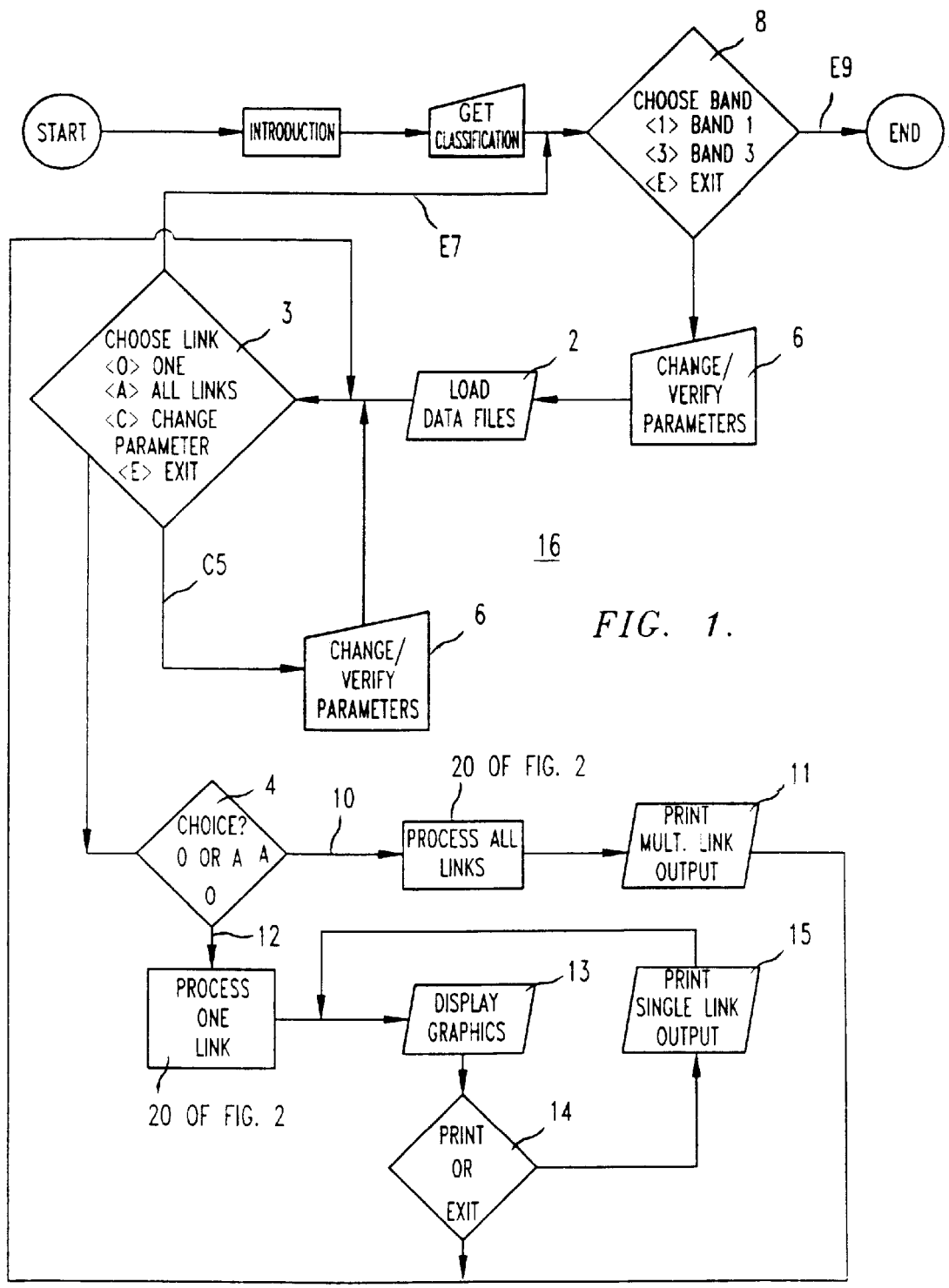
FIG. 1 is a conceptual flow diagram of an antenna modeling means of the automated antenna array modeling apparatus of the present invention.
Figure 2:
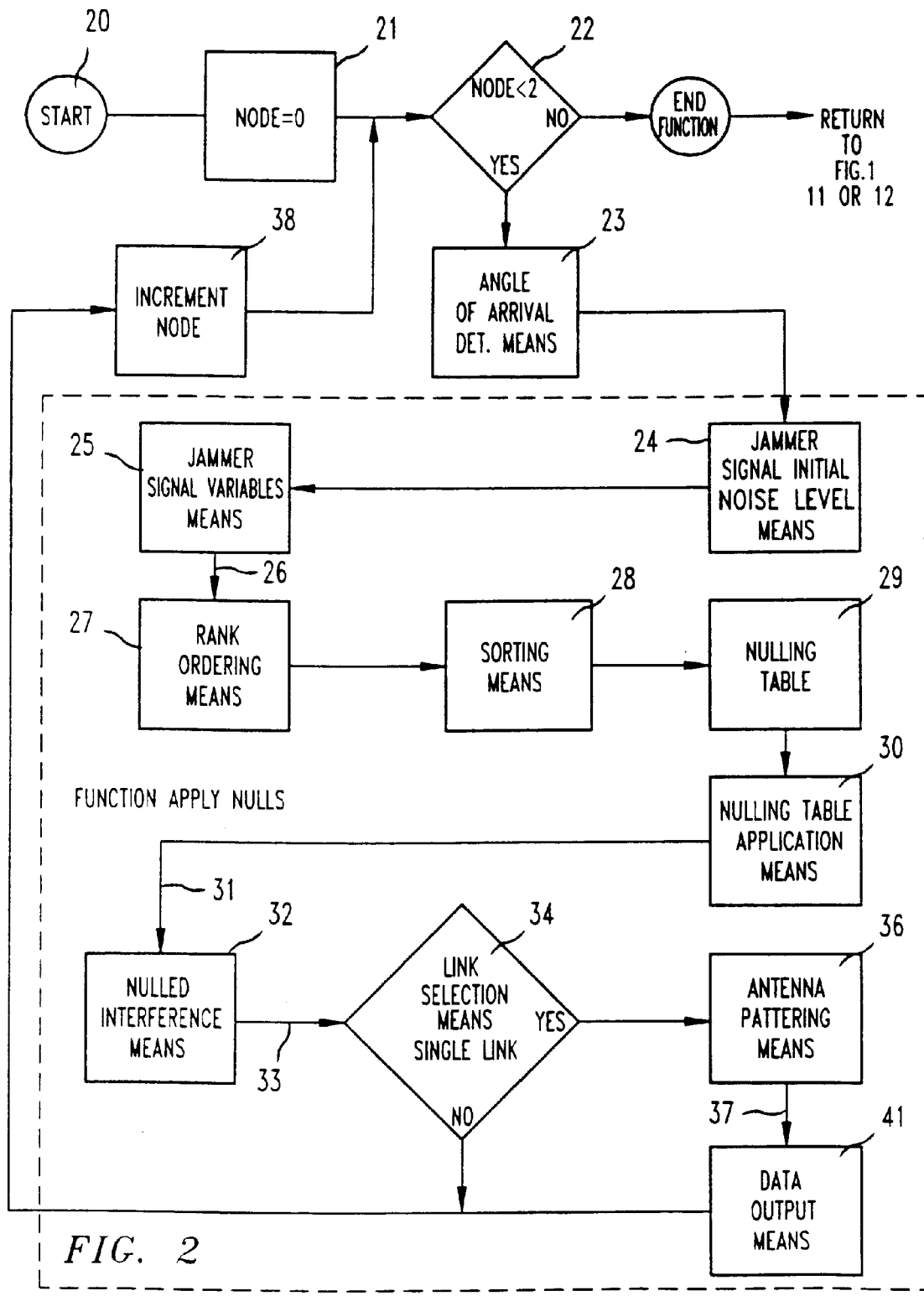
FIG. 2 depicts detailed operation of one node of a single link being processed.

FIG. 1 is an overall conceptual flow diagram of the antenna modeling means 16 of the automated interactive adaptive antenna patterning apparatus provided as one embodiment of the present invention, with said antenna modeling means 16 constructing an antenna description 20 that causes an antenna pattern to be adapted, modified and nulled as depicted in FIG. 2. For the sake of simplicity, the present invention will be described in terms of a tactical scenario having multiple antennas with multiple elements, however, the present invention can be also effectively used with a lesser number of antennas, or even a single antenna. Referring now to FIG. 1, a data loading means 2 furnishes a plurality of input data files for an adaptive antenna description to a link selection means 3.

Said plurality of input data files includes a link data file, a jammer file, an antenna file and a gain table forming said antenna description 20, said antenna description 20 being a model capable of being adapted and used throughout the apparatus of the present invention. Said plurality of input data files from the data loading means 2 having interference signals, receiving antennas, a nonadaptive reference element, incoming signals and noise inputs. Said plurality of input data files allow an operator to input a plurality of friendly and threat equipment laydowns, a plurality of desired and threat signal levels at each of a plurality of receiver isotropic antennas. Said plurality of link data files includes information about the relevant communications links of a given network, and said jammer file having location, signal power and frequency data for each jammer of interest. Through a means for link operating 4, the operator also inputs a plurality of antenna files, indicated by arrow 5, describing antenna configuration within a particular array and a gain table, or antenna pattern, for each element of said antenna description 20.

After said plurality of antenna files 5 are loaded, said link selection means 3 allows operator selection of a plurality of parameters. If change parameters <C> is selected, arrow 5, screen input parameters can be changed 6, and the selection process repeated. Choice of exit ,E>, arrow 7, causes a display of option screen 8 allowing exit via arrow 9 and termination of the program. Said modeling means 16 resolves said plurality of interference signals as seen by said antenna description 20.

Following operator selection of processing either single or multiple network links, utilizing said link selection means 3 and said link operating means 4, indicated by O or A, arrows 10 or 12 respectively, said antenna patterns are constructed one link at a time, as depicted in FIG. 2, and described more fully below. When multiple links are selected, arrow 10, a link file is printed 11 and a selection box, shown within the link selection means 3, is displayed for user input. Selection of one link, arrow 12, leads to antenna patterns and link scenario displays 13. Choice 14 allows the operator to print a link status report 15 or exit to selection screen 3.

Referring now to FIG. 2, depicting the detailed operation of one node of a single link being processed, said modeling means 16 transmits said plurality of input data files of FIG. 1 to said antenna description 20 and a node counter 21 is initialized and checked. If both nodes of a link are processed, control is returned to said modeling means 16, otherwise antenna array patterning begins in a means for determining angle-of-arrival 23.

Said angle-of-arrival determination means 23, having a plurality of angle-of-arrival algorithms, calculates angles of arrival of said plurality of interference signals at said node 21's receiving antennas and cooperates with a jammer signal initial noise level means 24 and a jammer signal variables means 25 in order to calculate an initial Signal-to-Noise Ratio, arrow 26, known in the art as (S/N). Said jammer signal initial noise level means 24 and said jammer signal variables means provide a prenulled Signal-to-Noise ratio to a means for rank-ordering means 27 that calculates a plurality of interference signal peaks, checks for inflection points where a rising signal strength changes to a falling signal strength and rank orders said plurality of interference signal peaks in order of signal strength. These are the peaks or points of maximum signal strength and correspond to groups of jammers or single strong jammers. Peaks falling within boresight are disregarded and the remaining peaks are sorted in order of signal strength by a sorting means 28.

Said sorting means 28, builds a nulling table 29, indicating where a null will be placed in the antenna patterns to provide a composite antenna pattern with the highest achievable Signal-to-Noise plus Interference ratio, S/(N+I). Nulling refers to taking a second independent sample of the wave front, phase shifting it by 180° and summing it with the first sample, requiring said sorting means 28 to direct a plurality of nulls at a plurality of interfering signals, while simultaneously directing a peak, preferably the highest, at a desired signal.

Calculations within said sorting means 28 are based on a virtual beam of constant width having no sidelobes scanning for jammer azimuth positions within said antenna array, with the supporting mathematical calculations disclosed further below with the methods of the present invention. This beam swings through 360° in one degree increments, and at each degree step, the level of incoming signals is determined by a series of null selecting beam calculations. Inflection points where a rising signal strength changes to a falling signal strength correspond to groups of jammers or a single strong jammer. Said sorting means 28 sorts the remaining signals in a nulling table 29. Where more nulls than peaks are available, the desired signal of said antenna description 20 will be optimized when this option is selected. The operator could have also selected placing a second null on each peak, beginning with the strongest peak, to optimize the null. Said sorting means 28 compiles a list of nulls and optimizations while constructing said nulling table 29.

The number of nulls to be applied to incoming signals is one less than the total number of elements in said antenna description 20. The effects of nulls are cumulative with later nulls affecting and being affected by previous nulls. The formation of nulls is based on the setting of the phase shifts and gains. Prior art mathematical models of adaptive antenna arrays assume that jammer locations are known and a set of simultaneous equations is solved to determine what weights in the adaptive array system would produce nulls. However, in the present invention said sorting means 28 in constructing said nulling table 29, applies nulls to the incoming signals representing signal gain and delay factors, respectively.

Figure 3:
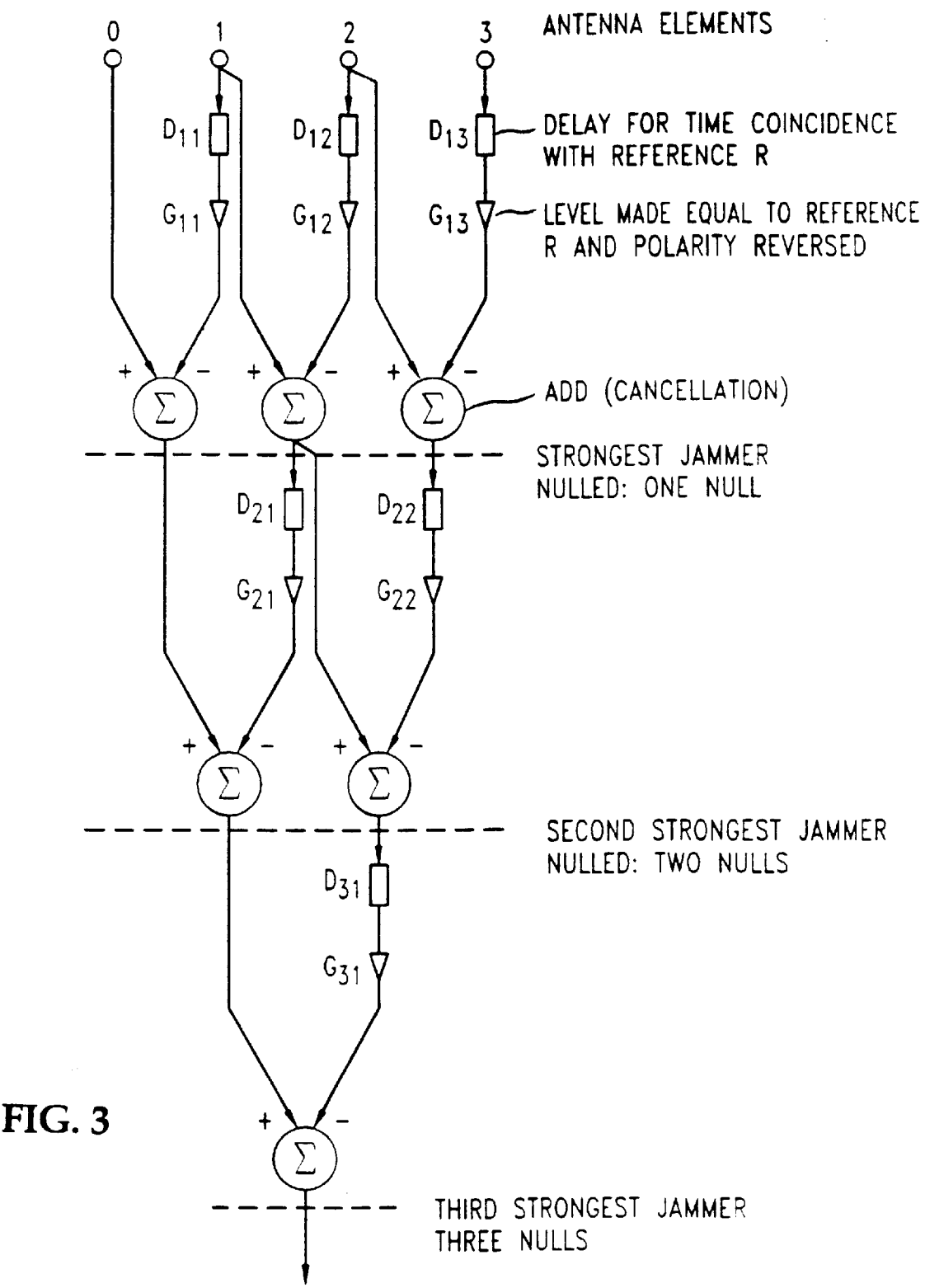
FIG. 3 depicts an example of a gain/delay solution lattice for a basic four element array producing three nulls utilized in the devices and methods of the present invention.

In operation, said sorting means 28 sorts simulated jammer signals. FIG. 3 is an example of a gain/delay solution lattice for a basic four element array producing three nulls utilized in the devices, methods and articles of manufacture of the present invention. The strongest signal is canceled first.

Figure 4:
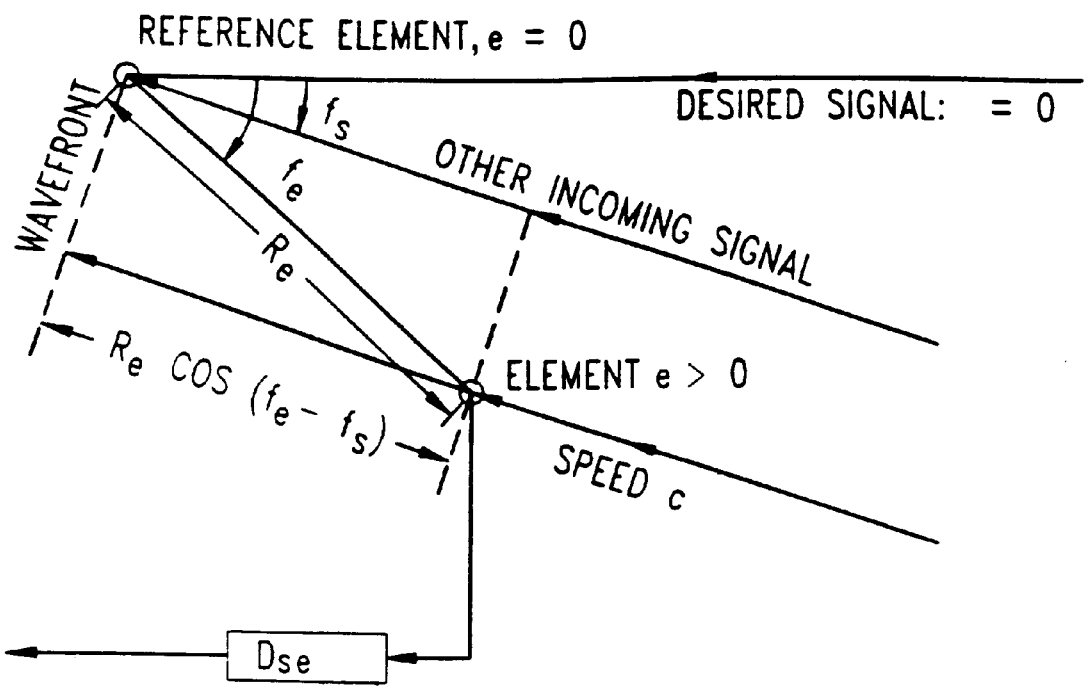
FIG. 4 illustrates the conceptual approach for calculating delay.

Mathematical modeling of adaptive array antennas requires the solution of simultaneous equations to determine the nulling weights, which are delays and gains for each element of said antenna description 20 producing the nulls necessary to cancel jammers or interferers with known locations, with the supporting mathematical calculations disclosed further below with the methods of the present invention. Up to now, for an array with multiple elements, this approach was considered too cumbersome. Said nulling table 29 employs several nulling algorithms to improve this situation. FIG. 4, which will be described in more detail below, illustrates how the delay calculation is related to angle of arrival.

FIG. 3 is an example of a four element array formulating a lattice and solution of successive two-terminal inputs cascaded through use of a nulling table. In FIG. 3, antenna elements 0–3, track the strongest interference signal. Weights in each section of the lattice in FIG. 3, specifically Delay, $D_{11}$, $D_{12}$ and $D_{13}$ and Gain, $G_{11}$, $G_{12}$ and $G_{13}$, respectively, are slaved together. Delay is the phase shift required to put the two signals, 0-1, 1-2 and 2-3 into time coincidence. The phase shift causes attenuation or amplification of the signal level. Gain is the voltage ratio that makes the two signals equal.

Construction of said nulling table 29 continues with the second and third strongest jammer being nulled, producing a total of 3 nulls in the FIG. 3 example. Once the third strongest FIG. 3 jammer is nulled, said nulling table 29, in cooperation with a nulling table application means 30, having a plurality of nulling algorithms, provides a thermal noise and S/N ratio in a sorted output, indicated by arrow 31, to a nulled interference means 32. Said nulling table application means 30 having a thermal noise level means, a plurality of jammer nulls and a plurality of desired signal modules.

FIG. 4 graphically illustrates the delay calculation portion of constructing said nulling table 29. In FIG. 4, a number of antenna elements, representing stationary antennas of said antenna description 20, are marked as e=0 to e=M, respectively. The position of the e=0 element and the direction of a desired incoming signal, are reference points for defining the positions of the other elements and the direction of arrival for any other incoming signal.

FIG. 5 illustrates the more detailed conceptual approach for calculating delay and voltage. Together with said sorted output 31, said nulling table application means 30 constructs a nulling table output, together with said sorted output 31, which is sent to said nulled interference means 32.

Factors in said nulling table output, are applied to said plurality of incoming signal inputs and said plurality of total noise inputs provided by said nulled interference means 32 and a desired signal means of the nulling application means 30, to produce a series of nulls. If a signal or interferer level is reduced below the total noise level, its power is set to the total noise level, because signals cannot be reduced below the noise floor. Furthermore, signal and interferer levels cannot be reduced by more than the maximum null depth as defined by the operator.

Said nulled interference means 32 provides a S/(N+I) output, indicated by arrow 33, comprising a Signal-to-Noise plus Interference ratio of the antenna description 20 to a link selection means 34. In S/(N+I), N includes thermal noise, background noise and receiver noise, I is interference due to friendly or enemy emitters and S includes desired signal and equipment line losses. Said S/(N+I) output 33 is compared with similar figures for the initial link status output 26 in said link selection means 34.

Figure 7:
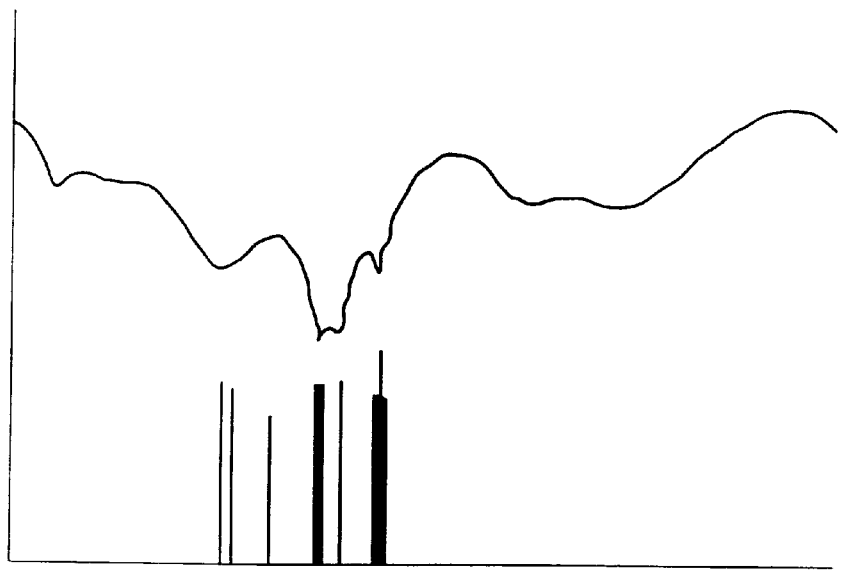
FIG. 7 depicts an antenna pattern example on an x/y axis.
Figure 8:
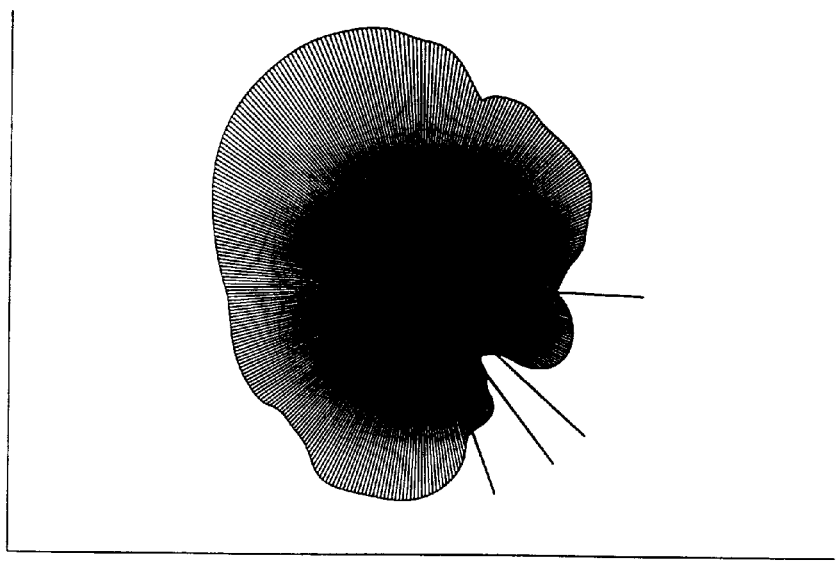
FIG. 8 depicts a circular antenna pattern example.
Figure 9:
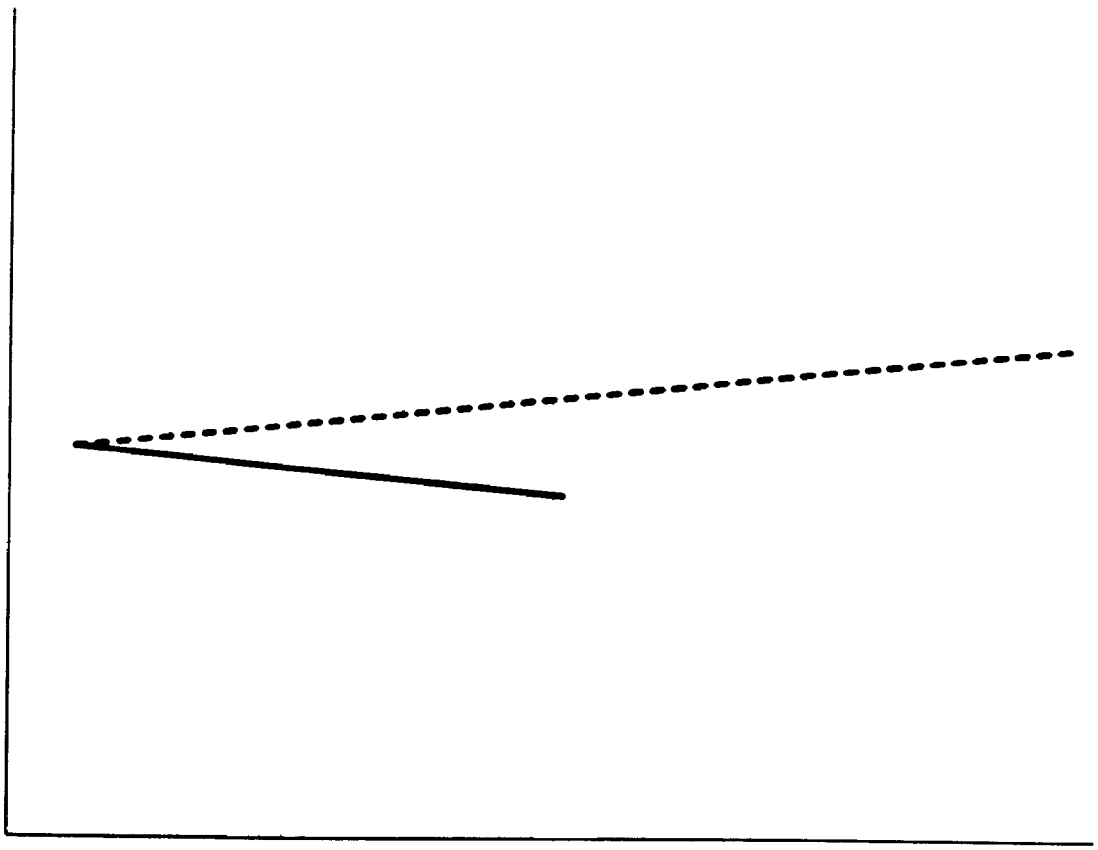
FIG. 9 depicts a visualization of a single link and interference sources.

After checking and adjusting for these limitations, said nulled interference means 32 calculates a nulled S/(N+I) output which is also transmitted to said link selection means 34. When the operator has selected a single link, said link selection means 34 either increments the node 38 or an antenna patterning means 36 constructs a single antenna pattern output 37.

Where a single link was selected, said antenna patterning means 36 provides said single antenna pattern output 37, to a means for data output 41 capable of displaying a graphical antenna pattern. Referring now to FIGS. 7–9, sample graphics screens illustrate said single antenna pattern display 37 graphically.

FIG. 7 is one example displaying a FIG. 2 type antenna pattern output, shown in a linear manner, with 0° at the left, 180° at center and 359° at the right. The thin horizontal white line represents zero dB gain with positive gain shown above the line and the vertical white lines showing null placement. Short dark lines depict the jammers' angle of arrivals, with the relative height of a short dark jammer lines showing the received signal strength. FIG. 8 depicts a sample circular antenna pattern, with the circular white line in the upper left quadrant representing 0° dB gain and positive gain shown outside the circular area. Long dark lines that show null placement and jammer angles of arrival which could be seen on said data output means 41, do not appear in FIG. 8. Another variation of the antenna pattern output from said antenna patterning means 37 is also depicted in FIG. 9, along with node information about that particular sample node. In addition to the graphical depictions illustrated in FIGS. 7–9, said printer 15 of FIG. 1 may also provide a printed output to said data output means 41, a sample of which is shown at TABLE I.

Where the operator has selected multiple links said nulled interference means 32 provides a multiple link Signal-to-Noise status report 38, to said printer 15 of FIG. 1. TABLE II is a continuous link output report shown as one example of said multiple link Signal-to-Noise status report 38. Said multiple link Signal-to-Noise status report 38 is only provided in a printed output report, such as that depicted in TABLE II. Said link comparison output 35 is then provided to said antenna patterning means 37 which, according to the operator's selection of a single link or multiple links during the operator's inputs to the construction of said antenna description 20, communicates either a single antenna pattern output arrow 37, or a multiple link Signal-to-Noise status report arrow 38.

A number of other embodiments of the device of the present invention are also encompassed within the disclosure and appended claims. In one embodiment, the present invention provides a software program which displays the antenna pattern produced at each selected receiver in an input scenario and provides an output detailing the S/N and improved performance achieved by a particular selected antenna configuration. In another variation of the device of the present invention, it is possible to use the device of the present invention as a design aid with a software program automatically determining the appropriate number of antenna elements for a particular application, or determining the optimum element spacing for an antenna array design. It is also within the contemplation of the present invention to provide an Adaptive Array Antenna Processor system that would use the nulling table approach described above.

A number of variations to any of the embodiments of the apparatus of the present invention are also possible, which include rank ordering interference signal peaks according to strongest and weakest signal levels, a larger variety of operator parameter selections, input data files, link data files and jammer files, neither negating nor degrading previous nulls, the interference signal peaks being points of maximum signal strength corresponding to a group of strong jammers, placing a second null on each peak, using spare tracking loops, the nulling table listing nulls and optimizations that represent signal gain and delay factors, the nulled interference means calculating a signal level and an interfere level below a total noise level, the rank-ordering means provides said sorted output in order of signal strength and providing the antenna pattern output for each receiver in a communications scenario. Further variations of the apparatus of the present invention are the data output means being a printing means that furnishes a printed report when the operator has selected a single antenna output, the link selection means permitting the operator to select either a single link or multiple link mode of operations and the apparatus further comprising a computer system having a plurality of software programs.

The present invention also encompasses automated methods for depicting and evaluating adaptive array antenna patterns and selecting adaptive array antenna characteristics comprising the steps of forming an antenna description with selected network and threat scenarios, resolving a plurality of interference signals seen by the antenna description's array, selecting a link operating mode, transmitting the array to an angle-of-arrival determination means, calculating angles of arrival of the interference signals, providing a pre-nulled Signal-to-Noise ration to a rank-ordering means, rank-ordering said plurality of interference signals according to angle of arrival and signal level at each receiver, constructing a nulling table in a sorting means, sorting a plurality of interference signal outputs by order of signal strength, calculating a total interference signal level and a signal-to-noise plus interference ratio, S/(N+I), for each receiver, reducing said plurality of interference signals by applying nulls to incoming signals representing signal gain and delay factors, maximizing a desired signal by using unengaged tracking loops to either renull the strongest interference signal or maximize the desired signal, applying a null lattice of said nulling table to form antenna patterns for each of said receivers, applying each of said antenna patterns to determine a nulled interference signal-to-noise ratio for each of said receivers, and providing a composite antenna data pattern output of said antenna description. One of the automated methods discloses using a computer system with a computer software program.

Referring back to the FIG. 1 overall conceptual flow diagram, the first method for modeling automated interactive adaptive antenna array patterns comprises the steps of forming an antenna description 20 with a selectable network and threat scenario capability in an antenna modeling means 16. The antenna description forming step begins with data loading in which a data loading means 1 furnishes a plurality of input data files 2, said plurality of input data files 2 including a link data file, a jammer file, an antenna file and a gain table to a link selection means 3, forming an antenna description 20, said antenna description being a model capable of being adapted and used in the methods of the present invention. Said input data files 2 having interference signals, receiving antennas, a nonadaptive reference element, incoming signals and total noise inputs.

In a link mode selecting step, the operator selects processing either single or multiple link processing. Said plurality of input data files 2 allows inputting a plurality of friendly and threat equipment laydowns and a plurality of desired and threat signal levels at each receiver isotropic antennas. Said link data file includes information about the relevant communications links of a given network, and said jammer file having location, signal power and frequency data for each jammer of interest. Through a means for link operating 4 the operator also inputs a plurality of antenna files 5 describing antenna configuration within a particular scenario and a gain table, or antenna pattern, for each antenna of said antenna description 20.

Once the model forming step is completed, a link operating mode step is performed wherein said link selection means 3 allows operator selection of several patterning parameters ,including selecting a single link or multiple link operating mode. If change parameters <C> is selected, arrow 5, screen input parameters can be changed 6, and the selection process repeated. Choice of exit ,E>, arrow 7, causes a display of option screen 8 allowing exit via arrow 9 and termination of the program. During a resolving step, the modeling means 15 resolves a plurality of interference signals as seen by the antenna description 20. Said antenna patterns 37 of the antenna description 20 are constructed link-by-link in the steps depicted in FIG. 2.

Referring now to FIG. 2, said antenna description 20 is transmitted to a means for determining angle-of arrival 23. During an angle determining step, said means for angle-of arrival determination 23, having a plurality of angle determining algorithms, calculates angles of arrival of said plurality of interference signals at said node 21's receiving antennas and cooperates with a jammer signal initial noise level means 24 and a jammer signal variables means 25 to calculate an initial Signal-to-Noise Ratio (S/N) 26. Said jammer signal initial noise level means 24 said jammer signal variables means provide a prenulled Signal-to-Noise ratio to a means for rank-ordering means 27 that calculates a plurality of interference signal peaks, checks for inflection points where a rising signal strength changes to a falling signal strength, disregards peaks falling within boresight and rank orders said plurality of interference signal peaks in order of signal strength. During a sorting step, a sorting means 28 sorts the remaining peaks in order of signal strength. Calculations within said sorting means 28 are premised on a virtual beam of constant width having no sidelobes scanning for jammer azimuth positions and are set forth more fully below. This beam is swung through 360° in one degree increments, and at each degree, the level of incoming signals is determined in a series of null selecting beam calculations below. In these calculations, inflections points, where a rising signal strength changes to a falling signal strength, correspond to groups of jammers or a single strong jammer.

Figure 6:
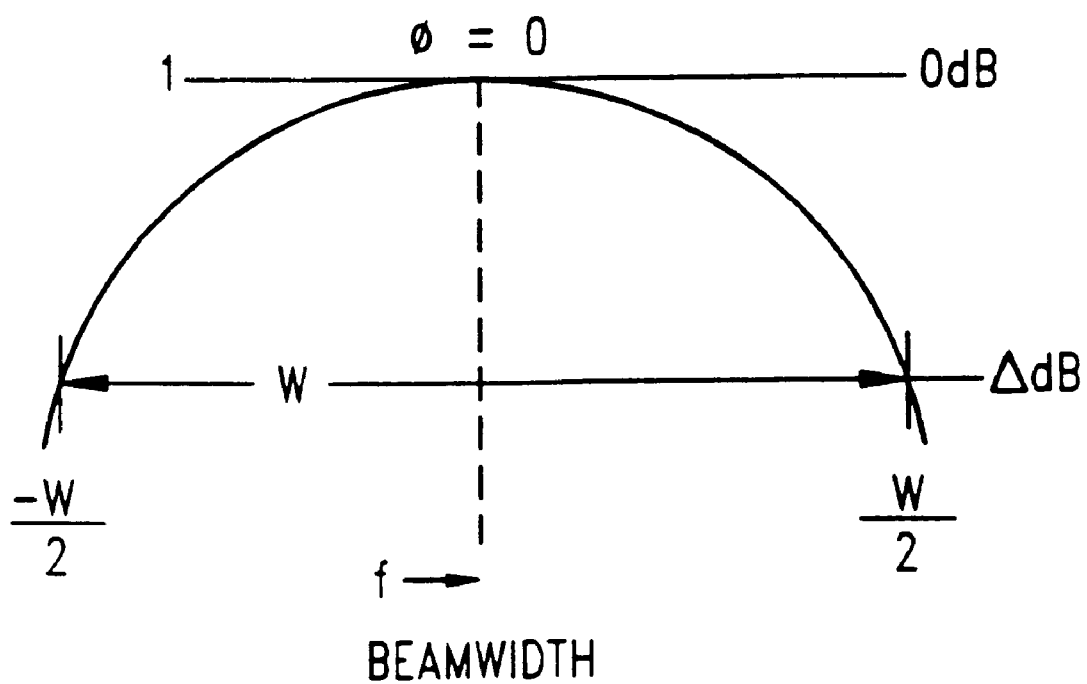
FIG. 6 illustrates the calculation of the incoming signal power.

In accordance with the methods of the present invention, determining where to place nulls and the sorting means 28 building a nulling table 29 are key aspects of this invention and are among its major advantages. This virtual beam is depicted in FIG. 6, with the width and depth of the null being formed when tracking loops are engaged assumed to be identical to those of the virtual beam. The calculation of gain from $-w/2$ to $+w/2$ is:

$$\left(\frac{1+\cos\phi}{2}\right)^v = \left(\cos^2\frac{\phi}{2}\right)^v$$

approaches Gaussian as $\phi \to 0$. If $w/2$ is small, then:

$$\cos^2\frac{\phi}{2} \cong 1 - \left(\frac{\phi}{2}\right)^2$$

When $w/2$ is small, then the reduction in voltage of the received signal level of any given signal in dB ($\Delta dB$) is:

$$\Delta = 0 - 20\log\left(\cos^2\frac{w/2}{2}\right)^v \cong -20v\log\left[1-\left(\frac{W}{4}\right)^2\right]$$

$$\ln(1+x) = x - \frac{x^2}{2} + \frac{x^3}{3} \cdots$$

$$\Delta dB \cong \frac{-20v}{\ln(10)}\ln\left[1-\left(\frac{W}{4}\right)^2\right] \cong \frac{-20v}{\ln(10)}\left(\frac{W}{4}\right)^2$$

$$v \cong \frac{16(\Delta dB)\ln(10)}{20(W \text{ radians})^2} = \frac{6047(\Delta dB)}{(W \text{ degrees})^2} \quad \text{Where } W \text{ is } 30°$$

where $W \leq 30°$. The width of the beam and the maximum depth of the null determine the value of $v$. With each jammer arriving from its angle $\phi_j$ at power $P_j$ (in dBm) as received by the reference element, the total power received (in dBm) from all jammers when the beam is at search angle $\phi_1$ is:

$$10\log\sum_{j=1}^{\text{all}}\left[\cos^{4v}\left(\frac{\phi_1-\phi_j}{2}\right)\right]\log^{-1}\left[\frac{P_j}{10}\right]$$

Nulls are placed where the total received powers are the greatest.

The sorting step concludes with sorting the remaining signals in a nulling table input 29 directing said sorting means 28 to apply nulls to peaks in that order of strength. If there are more nulls available than peaks, the desired signal of said antenna pattern 37 will be optimized.

In a nulling table construction step, several nulling algorithms are employed to determine delays and gains. Mathematical modeling of the model's adaptive array antennas solves simultaneous equations shown in FIG. 4 to determine the nulling weights, which are delays and gains for each element of the model producing the nulls necessary to cancel jammers or interferers with known locations. Referring back now to FIG. 3, antenna elements 0–3, respectively, are depicted. The delay and gain of the signal in one arm is adjusted to match that in the other, with a null, or principal minima, being produced when one arm is subtracted from the other, and a maximum power transfer efficiency, also known as a principal maxima, is obtained when the arms are added. The number of nulls which can be applied to incoming signals is one less than the total number of elements in the antenna description 20.

Referring once again to FIG. 4, each of the antenna elements is positioned at a radial distance $R_e$ from reference element e=0 and at an azimuth angle $\phi_e$ relative to the direction of the desired signal. When an incoming signal arrives at azimuth angle $\phi_s$ relative to the direction of said desired signal, its path to reference element e=0 is longer by a distance of $R_e \cos(\phi_e - \phi_s)$ with the velocity of light, c, being the velocity of propagation, so that said incoming signal arrives at a time $D_{se}$ later. The time delay, $D_{se}$, inserted in the element, e, output puts a signal arriving from direction $\phi_s$ into time coincidence with that signal's output from the reference element e=0. FIG. 5 illustrates the more detailed conceptual approach for calculating delay and voltage. Together with said sorted output 31, said nulling table application means 30 constructs a nulling table output, together with said sorted output 31, which is sent to said nulled interference means 32. Factors in said nulling table output, are applied to said plurality of incoming signal inputs and said plurality of total noise inputs provided by said nulled interference means 32 and a desired signal means of the nulling application means 30, to produce a series of nulls.

The network of said antenna description 20 nulls any signal arriving from a direction N, which is the direction in which the nth null is to be placed. A signal, S, entering the basic network from any direction other than said network N is not nulled, however, signal S receives the same delay and amplitude change as signal N. The equations for finding the amplitude and delay of S as it leaves the basic network are provided in FIG. 3. The delay in every signal is specified relative to the reference element e=0. Integers n and e are used for counting.

Referring now to both FIG. 3 and FIG. 5, respectively, a nulling step is depicted. In FIG. 5, integer n=1 for the stage producing the first null, n=2 in the stage producing the second null, and so on. In FIG. 5, i as used within the lattices designates the stage. Stages range from one to a maximum (M) which is one less than the number of said antenna elements in said array. The number of stages relates to the number of nulls which can be produced by said array.

In operation, equipment limitations will constrain the depth of the null. There is an error, $\epsilon$, in matching the amplitude of the signal coming from the auxiliary antenna to that of the reference antenna. E is expressed as a fractional percentage of the noise ratios. Therefore, the gain becomes $$G_{n,i} = -(1-\varepsilon)\frac{N_{n,i-1}}{N_{n,i}}$$

and the maximum null depth in dBm is:

$$10\log\left(\frac{\epsilon^2}{2}\right)$$

Optimization, instead of nulling, is achieved when the gain is positive:

$$G_{n,i} = +(1-\varepsilon)\frac{N_{n,i-1}}{N_{n,i}}$$

Furthermore, the null depth will be limited by the noise floor or total noise. A signal level cannot be reduced lower than the noise floor.

The total noise is a combination of thermal noise, receiver amplifier noise, an adaptive array antenna amplifier noise and a background, or ambient, noise. For the receiver, the total noise, including ambient, in dBm is expressed as:

$$N_R = B_G + F_R + 10\log(\Delta f_R kT)$$

where $B_G$ is the background noise in milliwatts, $F_R$ is the receiver amplifier's noise in milliwatts, $\Delta f_R$ is the bandwidth of the receiver in Hz, k is Boltzmann's Constant=$1.38 \times 10^{-23}$ joules/°K and T is the absolute temperature=293° K. Similarly, said array total noise, excluding ambient noise, in dBm is expressed as:

$$N_{AAA} = F_{AAA} - 113.93 + 10\log(\Delta f_{AAA})$$

where $F_{AAA}$ is the AAA amplifier's noise figure in dB and $\Delta f_{AAA}$ is the bandwidth of the AAA in MHz. Each element will contribute this noise, therefore, the noise is the sum of $N_R$ and $nN_{AAA}$, n is the number of elements −1, added as powers and converted back to dBm:

$$N_T = 10\log(10^{NR/10} + n10^{NAAA/10})$$

If a signal or interferer level is reduced below the total noise level, its power is set to the total noise level, because signals cannot be reduced below the noise floor. Furthermore, signal and interferer levels cannot be reduced by more than the maximum null depth as defined by the operator during the data loading step. This calculation is done for every node in the network. The antenna's pattern will be different at each node and therefore the nulling tables formed will be different. Said nulled interference means 32 provides a S(N+I) output 33, comprising a Signal-to-Noise plus Interference ratio of the array, to said link selection means 34. After checking and adjusting for these limitations, said nulled interference means 32 calculates a nulled S(N+I) output, which is also provided to said [node comparison] link selection means 34. During a comparison step, said S/(N+I) output 33 is compared with similar figures for the initial link status output 26 in said link selection means 34.

In an incrementing step, when the operator has selected a single link, said link selection means 34 either increments the node 38 or an antenna patterning means 36 constructs a single antenna pattern output 37 which is provided to a data output means 41 for a display step.

Where a single link mode was selected in said link selection step, during said display step said antenna patterning means 37 provides said single antenna pattern output 37 with a graphical antenna pattern output for said data output means 41. Referring now to FIGS. 7–9, sample graphics screens illustrate said single antenna pattern output graphically. Where the operator has selected a multiple link operations mode, said nulled interference means 32 provides a multiple link Signal-to-Noise status report 38 to printer 15 depicted in FIG. 1. TABLE II is an example of a printed link report output. Said multiple link Signal-to-Noise status report 38 is only provided as a printed output report, such as that depicted in TABLE II. Said link comparison output 35 is then provided to said antenna patterning means 37 which, according to the operator's selection of a single link or multiple links during the operator's inputs to the construction of said array 20, communicates either a single antenna pattern output arrow 37, or a multiple link Signal-to-Noise status report arrow 38.

A number of other embodiments of the methods of the present invention are also encompassed within the disclosure and appended claims. In one embodiment, the present invention provides a software program which displays the antenna pattern produced at each selected receiver in an input scenario and provides an output detailing the S/N and improved performance achieved by a particular selected antenna configuration. In another variation of the method of the present invention, it is possible to use these techniques as a design aid with a software program automatically determining the appropriate number of antenna elements for a particular application, or determining the optimum element spacing for an antenna array design. It is also within the contemplation of the present invention to provide an Adaptive Array Antenna Processor method. The Adaptive Array Antenna Processor system would use the nulling table approach for solution of nulling vectors.

A number of variations to any of the embodiments of the methods of the present invention are also possible, which include rank ordering interference signal peaks according to strongest and weakest signal levels, selecting a larger variety of operator parameters, input data files, link data files and jammer files, neither negating nor degrading previous nulls, the interference signal peaks being points of maximum signal strength corresponding to a group of strong jammers, placing a second null on each peak, using spare tracking loops, listing nulls and optimizations in the nulling table that represent signal gain and delay factors, calculating a signal level and an interfere level below a total noise level, the rank-ordering means providing said sorted output in order of signal strength and providing the antenna pattern output for each receiver in a communications scenario. Further variations of the methods of the present invention are the data output means being a printing means that furnishes a printed report when the operator has selected a single antenna output, the link selection means permitting the operator to select either a single link or multiple link mode of operations and the method further comprising use of a computer system having a plurality of software programs.

The present invention also encompasses a computer-readable medium, such as a computer program, as an article of manufacture, capable of simply and effectively providing automatic antenna array patterns as an article of manufacture to automatically performs the necessary measurements and calculations and operates in essentially the manner as disclosed for the devices and methods of the present invention in accordance with FIGS. 1 and 2. Referring once again to FIGS. 1 and 2, the present invention provides a computer-readable medium whose contents cause a computer system to depict adaptive array antenna patterns and select adaptive antenna array characteristics, said computer system having an antenna modeling means, a means for determining angle-of-arrival, a means for rank-ordering, a means for sorting and a means for antenna patterning. Said antenna modeling means 16, having a data loading means 1 and a loop back inquiry means, receives a plurality of input data files 2 and a plurality of operator parameter selections, said plurality of input data files including a plurality of antenna files and an antenna gain table and said plurality of operator parameter selections including a number of antenna elements, antenna element spacing, maximum null depth, type of antenna, type of element, selected signal and a maximum null depth. Said modeling means 16 constructs an antenna description 20, said antenna description 20 representing a plurality of elements and being a model capable of being adapted and used in the computer-readable medium of the present invention. A means for link operating 4 permits the operator to input said plurality of antenna configuration files 5 and select an antenna gain table for each of said plurality of antennas of the antenna description 20, said modeling means 16 simulates a plurality of interference signals, a nonadaptive reference element, a plurality of incoming signal inputs and a plurality of total noise inputs in the presence of said antenna description 20.

Said modeling means 16 resolves said plurality of interference signals as seen by said antenna description 20, a node counter 21 is initialized and checked. Said link selection means 3 permits the operator to select a single link operating mode or multiple link operating mode for said antenna description 20, when said single link operating mode is selected, said antenna description 20 is transmitted to said angle-of-arrival determination means 23, said angle-of-arrival determination means 23, having a plurality of arrival algorithms, calculates a plurality of angles of arrival of said plurality of interference signals for each receiving antenna of the antenna description 20 at said node counter 21.

A jammer signal initial noise level means 24 and a jammer signal variables means 25 utilizing said plurality of angles of arrival and a background noise input cooperate with said angle-of-arrival determination means 23 to calculate an initial noise level for a selected antenna of said antenna description 20. Said initial noise level is provided to a Signal-to-Noise ratio means, said Signal-to-Noise ratio means and said jammer signals variable means provide a prenulled Signal-to-Noise ratio to said rank-ordering means 27. Said rank-ordering means 27, having a plurality of ordering algorithms, calculates a plurality of interference signal peaks of said array and rank orders said plurality of interference signal peaks by order of signal strength in a nulling table input provided to said sorting means 28, which constructs a nulling table 29 indicating where to place a null in antenna patterns by providing a composite antenna pattern with the highest achievable Signal-to-Noise plus Interference ratio, S/(N+I). Said sorting means 28 directs nulls at said plurality of interfering signals while simultaneously directing a peak at a desired signal and said sorting means 28 applies nulls to the incoming signals representing signal gain and delay factors and sorts a plurality of simulated jammer signals. Said nulling table 29, adjusting a plurality of gain factors and a plurality of delay factors, and in cooperation with a nulling table application means 30 provides a sorted output 31 to said nulling table application means 30. Said nulling table application means 30, having a plurality of nulling algorithms, utilizes said nulling table 29 and said sorted output 31 to calculate a Signal-to-Noise Plus Interference ratio of said antenna description 20 and applies a nulling table output to a plurality of incoming signal inputs and a plurality of total noise inputs to reduce said plurality of incoming signals between said plurality of total noise inputs and said maximum null depth, said nulling table application means 30 provides said nulling table output 31 to a nulled interference means 32.

Said nulled interference means 32 and a desired signal means of said nulling table application means 30 calculates a nulled Signal-to-Noise Plus Interference output 33 to produce a series of nulls, said nulled interference means 32 providing said nulled Signal-to-Noise Plus Interference output 33 to a link selection means 34, which compares said nulled Signal-to-Noise Plus Interference output 33 with an array threshold value from said initial link status output 26. When the operator has selected a single link, said link selection means 34 increments a node only once to obtain both ends of the link, and said antenna patterning means 36 constructs an adaptive antenna pattern output 37 provided to a data output means 41 depicting a single antenna array pattern.

The different embodiments and variations found with the apparatus and methods of the present invention are also within the contemplation of the computer-readable medium article of manufacture of the present invention.

What we claim is:

1. An automated interactive antenna patterning apparatus for depicting adaptive array antenna patterns and selecting adaptive antenna array characteristics, comprising:

a means for antenna modeling, having a data loading means and a loop back inquiry means, receives a plurality of input data files and a plurality of operator parameter selections;

said plurality of input data files including a plurality of antenna files and an antenna gain table;

said plurality of operator parameter selections including a number of antenna elements, antenna element spacing, maximum null depth, type of antenna, type of element, selected signal and a maximum null depth;

said modeling means constructs an adaptive antenna description, said antenna description representing a plurality of elements;

a means for link operating permits the operator to input said plurality of antenna configuration files and select an antenna gain table for each of said plurality of elements of the antenna description;

said modeling means simulates a plurality of interference signals, a nonadaptive reference element, a plurality of incoming signal inputs and a plurality of total noise inputs in the presence of said antenna description;

said modeling means resolves said plurality of interference signals as seen by said antenna description;

a node counter is initialized and checked;

said link selection means permits the operator to select a single link operating mode or multiple link operating mode for said antenna description;

when said single link operating mode is selected, said antenna description is transmitted to a means for determining angle-of-arrival;

said angle-of-arrival determination means, having a plurality of angle-of-arrival algorithms, calculates a plurality of angles of arrival of said plurality of interference signals for each receiving antenna of the antenna description at said node counter;

a jammer signal initial noise level means and a jammer signal variables means utilizing said plurality of angles of arrival and a background noise input cooperate with said angle-of-arrival determination means to calculate an initial noise level for a selected antenna of said antenna description;

said initial noise level is provided to a said jammer signal initial noise level means, said jammer signal initial noise level means and said jammer signals variable means provide a prenulled Signal-to-Noise ratio to a means for rank-ordering;

said rank-ordering means, having a plurality of ordering algorithms, calculates a plurality of interference signal peaks of said antenna description and rank orders said plurality of interference signal peaks by order of signal strength in a nulling table input provided to a means for sorting;

said sorting means constructs a nulling table;

said nulling table indicating where to place a null in antenna patterns providing a composite antenna pattern with the highest achievable Signal-to-Noise plus Interference ratio, S/(N+I);

said sorting means directs nulls at said plurality of interfering signals while simultaneously directing a peak at a desired signal;

said sorting means applies nulls to the incoming signals representing signal gain and delay factors and sorts a plurality of simulated jammer signals;

said nulling table, adjusting a plurality of gain factors and a plurality of delay factors, and in cooperation with a nulling table application means provides a sorted output to said nulling table application means;

said nulling table application means, having a plurality of nulling algorithms, utilizes said nulling table and said sorted output to calculate a Signal-to-Noise Plus Interference ratio of said array and applies a nulling table output to a plurality of incoming signal inputs and a plurality of total noise inputs to reduce said plurality of incoming signals between said plurality of total noise inputs and said maximum null depth, said nulling table application means provides said nulling table output to a nulled interference means;

said nulled interference means and a desired signal means of said nulling table application means calculates a nulled Signal-to-Noise Plus Interference output to produce a series of nulls, said nulled interference means providing said nulled Signal-to-Noise Plus Interference output to a link selection means;

said link selection means compares said nulled Signal-to-Noise Plus Interference output with an array threshold value from said initial link status output;

when the operator has selected a single link, said link selection means increments a node once; and an antenna patterning means constructs an adaptive antenna pattern output provided to a data output means depicting a single antenna array pattern.

2. The automated interactive antenna patterning apparatus, as recited in claim 1, further comprising:

said rank-ordering means orders said plurality of interference signal peaks of said antenna description and rank orders said plurality of interference signal peaks by order of signal strength in said nulling table input according to strongest and weakest signal levels;

said plurality of operator parameter selections including a number of antenna elements, antenna element spacing, maximum null depth, type of antenna, type of element, selected signal, a maximum null depth;

said plurality of input data files including a link data file, a jammer file, an antenna file and a gain table allowing the operator to input a plurality of friendly and threat equipment laydowns, a plurality of desired and threat signal levels for each of said plurality of receiver antennas;

said link data file containing information about the relevant communications links of a given network; and said jammer file having location, signal power and frequency data for each of a plurality of jammers of interest.

3. The automated interactive antenna patterning apparatus, as recited in claim 2, wherein:

the number of said plurality of nulls which can be applied to incoming signals is one less than the total number of antennas provided in said antenna description;

said plurality of nulls not being negated by previous nulls;

said plurality of nulls not being degraded by previous nulls; and the formation of said plurality of nulls being based on the setting of the phase shifts and gains.

4. The automated interactive antenna patterning apparatus, as recited in claim 3, further comprising:

the operator selecting a virtual width beam;

said rank-ordering means detects said plurality of inflection points when a rising signal strength changes to a falling signal strength by swinging said virtual width beam through said array in one degree increments on a 360° scale; and said interference signal peaks being points of maximum signal strength corresponding to a plurality of strong jammers.

5. The automated interactive antenna patterning apparatus, as recited in claim 4, further comprising:

said plurality of operator parameter selections permit placing a second null on each of said peaks, beginning with the strongest peak; and said plurality of operator parameter selections permit optimizing said desired signal with a plurality of spare tracking loops.

6. The automated interactive antenna patterning apparatus, as recited in claim 5, further comprising said nulling table, having a listing of nulls and optimizations compiled by said sorting means, represents signal gain and delay factors.

7. The automated interactive antenna patterning apparatus, as recited in claim 6, further comprising:

said nulled interference means calculates a signal level and an interferer level reduced below a total noise level;

said nulled interference means having power set to said total noise level because signals cannot be reduced below the noise floor; and said signal level and said interferer levels cannot be reduced by more than said maximum null depth.

8. The automated interactive antenna patterning apparatus, as recited in claim 7, further comprising:

said rank-ordering means disregarding a plurality of peaks which fall within boresight; and said rank ordering means, in constructing said nulling table, provides said sorted output in order of signal strength.

9. The automated interactive antenna patterning apparatus, as recited in claim 8, further comprising said antenna pattern output is provided for each of said receivers in a communications scenario.

10. The automated interactive antenna patterning apparatus, as recited in claim 8, further comprising:

said data output means is a printing means when the operator has selected said single antenna output pattern;

said printing means provides a printed report of a plurality of communications link status characteristics; and said data output means displays said adaptive antenna pattern output and said plurality of communications link status characteristics.

11. The automated interactive antenna patterning apparatus, as recited in claim 8, further comprising:

said link selection means permits the operator to select said single link mode of operation; and said link selection means permits the operator to select a multiple network link mode of operation.

12. The automated interactive antenna patterning apparatus, as recited in claim 1, further comprising a computer system having a plurality of software programs.

13. An automated interactive antenna patterning method for depicting adaptive array antenna patterns and selecting adaptive antenna array characteristics, comprising the steps of:

loading a plurality of input data files and a plurality of operator parameter selections onto a means for antenna modeling;

said antenna modeling means having a data loading means and a loop back inquiry means, said plurality of input data files including a plurality of antenna files and an antenna gain table, said plurality of operator parameter selections including a number of antenna elements, antenna element spacing, maximum null depth, type of antenna, type of element, selected signal and a maximum null depth;

constructing an adaptive antenna description in said antenna modeling means, said antenna description representing a plurality of elements;

inputting said plurality of antenna configuration files with a means for link operating;

selecting an antenna gain table for each of said plurality of elements of the antenna description;

said modeling means simulating a plurality of interference signals, a nonadaptive reference element, a plurality of incoming signal inputs and a plurality of total noise inputs in the presence of said antenna description;

said modeling means resolving said plurality of interference signals as seen by said antenna description;

initializing a node counter;

checking said node counter;

selecting a single link operating mode or multiple link operating mode for said array with said link selection means;

transmitting said antenna description to a means for determining angle-of-arrival when said single link operating mode is selected;

calculating a plurality of angles of arrival of said plurality of interference signals for each receiving antenna of the antenna description at said node counter, by said angle-of-arrival determination means, said angle-of-arrival determination means having a plurality of angle-of-arrival algorithms;

calculating an initial noise level for a selected antenna of said antenna description by said angle-of-arrival determination means, said angle-of-arrival determination means cooperating with a jammer signal initial noise level means and a jammer signal variables means, utilizing said plurality of angles of arrival and a background noise input;

providing said initial noise level to said jammer signal initial noise level means, said jammer signal initial noise level means and said jammer signals variable means providing a prenulled Signal-to-Noise ratio to a means for rank-ordering;

calculating a plurality of interference signal peaks of said antenna description, said rank ordering means, having a plurality of ordering algorithms, rank orders said plurality of interference signal peaks by order of signal strength in a nulling table input provided to a means for sorting;

constructing a nulling table in said sorting means;

placing a null in an antenna pattern, said nulling table provides a composite antenna pattern with the highest achievable Signal-to-Noise plus Interference ratio, S/(N+I);

directing nulls at said plurality of interfering signals, said sorting means simultaneously directing a peak at a desired signal;

applying the nulls to the incoming signals representing signal gain and delay factors, said sorting means, having constructed said nulling table, sorts a plurality of simulated jammer signals;

adjusting a plurality of gain factors and a plurality of delay factors, said nulling table in cooperation with a means for nulling application provides a sorted output to said nulling table application means;

calculating a Signal-to-Noise Plus Interference ratio of said array, said nulling table application means, having a plurality of nulling algorithms, using said nulling table and said sorted output, applies a nulling table output to a plurality of incoming signal inputs and a plurality of total noise inputs to reduce said plurality of incoming signals between said plurality of total noise inputs and said maximum null depth said nulling table application means provides said nulling table output to a means for nulled interference;

calculating a nulled Signal-to-Noise Plus Interference output, said nulled interference means and a desired signal means of said nulling table application means, producing a series of nulls, said nulled interference means provides said nulled Signal-to-Noise Plus Interference output to a link selection means;

comparing said nulled Signal-to-Noise Plus Interference output with an array threshold value from said initial link status output, in said link selection means;

incrementing a node once by said link selection means when the operator has selected a single link; and constructing an adaptive antenna pattern output in said patterning means, said antenna patterning means providing said adaptive antenna pattern output to a data output means depicting a single antenna array pattern.

14. The automated interactive antenna patterning method, as recited in claim 13, wherein:

said rank-ordering means orders said plurality of interference signal peaks of said antenna description and rank orders said plurality of interference signal peaks by order of signal strength in said nulling table input according to strongest and weakest signal levels;

said plurality of operator parameter selections including a number of antenna elements, antenna element spacing, maximum null depth, type of antenna, type of element, selected signal, a maximum null depth;

said plurality of input data files including a link data file, a jammer file, an antenna file and a gain table allowing the operator to input a plurality of friendly and threat equipment laydowns, a plurality of desired and threat signal levels for each of said plurality of receiver antennas;

said link data file containing information about the relevant communications links of a given network; and said jammer file having location, signal power and frequency data for each of a plurality of jammers of interest.

15. The automated interactive antenna patterning method, as recited in claim 14, wherein:

the number of said plurality of nulls which can be applied to incoming signals is one less than the total number of antennas provided in said antenna description;

said plurality of nulls not being negated by previous nulls;

said plurality of nulls not being degraded by previous nulls; and the formation of said plurality of nulls being based on the setting of the phase shifts and gains.

16. The automated interactive antenna patterning method, as recited in claim 15, further comprising the steps of:

selecting a virtual width beam;

detecting said plurality of inflection points by said rank-ordering means when a rising signal strength changes to a falling signal strength by swinging said virtual width beam through said array in one degree increments on a 360° scale; and said interference signal peaks being points of maximum signal strength corresponding to a plurality of strong jammers.

17. The automated interactive antenna patterning method, as recited in claim 16, wherein:

said plurality of operator parameter selections permit placing a second null on each of said peaks, beginning with the strongest peak; and said plurality of operator parameter selections permit optimizing said desired signal with a plurality of spare tracking loops.

18. The automated interactive antenna patterning method, as recited in claim 17, further comprising said nulling table, having a listing of nulls and optimizations compiled by said sorting means, represents signal gain and delay factors.

19. The automated interactive antenna patterning method, as recited in claim 18, further comprising the steps of:

calculating a signal level and an interferer level by said nulled interference means reduced below a total noise level;

said nulled interference means having power set to said total noise level because signals cannot be reduced below the noise floor; and reducing said signal level and said interferer levels by no more than said maximum null depth.

20. The automated interactive antenna patterning method, as recited in claim 19, further comprising the steps of:

said rank-ordering means disregarding a plurality of peaks falling within boresight; and said rank ordering means, in constructing said nulling table, provides said sorted output in order of signal strength.

21. The automated interactive antenna patterning method, as recited in claim 20, further comprising providing said antenna pattern output for each of said receivers in a communications scenario.

22. The automated interactive antenna patterning method, as recited in claim 20, further comprising the steps of:

said data output means being a printing means when the operator has selected said single antenna output pattern;

providing a printed report of a plurality of communications link status characteristics from said printing means; and displaying said adaptive antenna pattern output and said plurality of communications link status characteristics by said data output means.

23. The automated interactive antenna patterning method, as recited in claim 20, wherein:

said link selection means permits the operator to select said single link mode of operation; and said link selection means permits the operator to select a multiple network link mode of operation.

24. The automated interactive antenna patterning method, as recited in claim 13, further comprising the step of employing a computer system having a plurality of software programs.

25. A computer-readable medium whose contents cause a computer system to depict adaptive array antenna patterns and select adaptive antenna array characteristics, said computer system having an antenna modeling means, a means for determining angle-of-arrival, a means for rank-ordering, a means for sorting and a means for antenna patterning, comprising:

said antenna modeling means, having a data loading means and a loop back inquiry means, receives a plurality of input data files and a plurality of operator parameter selections;

said plurality of input data files including a plurality of antenna files and an antenna gain table;

said plurality of operator parameter selections including a number of antenna elements, antenna element spacing, maximum null depth, type of antenna, type of element, selected signal and a maximum null depth;

said modeling means constructs an adaptive antenna description, said antenna description representing a plurality of elements;

a means for link operating permits the operator to input said plurality of antenna configuration files and select an antenna gain table for each of said plurality of elements of the antenna description;

said modeling means simulates a plurality of interference signals, a nonadaptive reference element, a plurality of incoming signal inputs and a plurality of total noise inputs in the presence of said antenna description;

said modeling means resolves said plurality of interference signals as seen by said antenna description;

a node counter is initialized and checked;

said link selection means permits the operator to select a single link operating mode or multiple link operating mode for said array;

when said single link operating mode is selected, said array is transmitted to said angle-of-arrival determination means;

said angle-of-arrival determination means, having a plurality of angle-of-arrival algorithms, calculates a plurality of angles of arrival of said plurality of interference signals for each receiving antenna of the antenna description at said node counter;

a jammer signal initial noise level means and a jammer signal variables means utilizing said plurality of angles of arrival and a background noise input cooperate with said angle-of-arrival determination means to calculate an initial noise level for a selected antenna of said antenna description;

said initial noise level is provided to jammer signal initial noise level means, jammer signal initial noise level means and said jammer signals variable means provide a prenulled Signal-to-Noise ratio to said rank-ordering means;

said rank-ordering means, having a plurality of ordering algorithms, calculates a plurality of interference signal peaks of said antenna description and rank orders said plurality of interference signal peaks by order of signal strength in a nulling table input provided to said sorting means;

said sorting means constructs a nulling table;

said nulling table indicating where to place a null in antenna patterns provides a composite antenna pattern with the highest achievable Signal-to-Noise plus Interference ratio, S/(N+I);

said sorting means directs nulls at said plurality of interfering signals while simultaneously directing a peak at a desired signal;

said sorting means applies nulls to the incoming signals representing signal gain and delay factors and sorts a plurality of simulated jammer signals;

said nulling table, adjusting a plurality of gain factors and a plurality of delay factors, and in cooperation with a nulling table application means provides a sorted output to said nulling table application means;

said nulling table application means, having a plurality of nulling algorithms, utilizes said nulling table and said sorted output to calculate a Signal-to-Noise Plus Interference ratio of said array and applies a nulling table output to a plurality of incoming signal inputs and a plurality of total noise inputs to reduce said plurality of incoming signals between said plurality of total noise inputs and said maximum null depth, said nulling table application means provides said nulling table output to a nulled interference means;

said nulled interference means and a desired signal means of said nulling table application means calculates a nulled Signal-to-Noise Plus Interference output to produce a series of nulls, said nulled interference means providing said nulled Signal-to-Noise Plus Interference output to a link selection means;

said link selection means compares said nulled Signal-to-Noise Plus Interference output with an array threshold value from said initial link status output;

when the operator has selected a single link, said link selection means increments a node once; and said antenna patterning means constructs an adaptive antenna pattern output provided to a data output means depicting a single antenna array pattern.

26. The computer-readable medium, as recited in claim 25, wherein:

said rank-ordering means orders said plurality of interference signal peaks of said antenna description and rank orders said plurality of interference signal peaks by order of signal strength in said nulling table input according to strongest and weakest signal levels;

said plurality of operator parameter selections including a number of antenna elements, antenna element spacing, maximum null depth, type of antenna, type of element, selected signal, a maximum null depth;

said plurality of input data files including a link data file, a jammer file, an antenna file and a gain table allowing the operator to input a plurality of friendly and threat equipment laydowns, a plurality of desired and threat signal levels for each of said plurality of receiver antennas;

said link data file containing information about the relevant communications links of a given network; and said jammer file having location, signal power and frequency data for each of a plurality of jammers of interest.

27. The computer-readable medium, as recited in claim 26, wherein:

the number of said plurality of nulls which can be applied to incoming signals is one less than the total number of elements provided in said antenna description;

said plurality of nulls not being negated by previous nulls;

said plurality of nulls not being degraded by previous nulls; and the formation of said plurality of nulls being based on the setting of the phase shifts and gains.

28. The computer-readable medium, as recited in claim 27, further comprising:

the operator selecting a virtual width beam;

said rank-ordering means detects said plurality of inflection points when a rising signal strength changes to a falling signal strength by swinging said virtual width beam through said antenna description in one degree increments on a 360° scale; and said interference signal peaks being points of maximum signal strength corresponding to a plurality of strong jammers.

29. The computer-readable medium, as recited in claim 28, further comprising:

said plurality of operator parameter selections permit placing a second null on each of said peaks, beginning with the strongest peak; and said plurality of operator parameter selections permit optimizing said desired signal with a plurality of spare tracking loops.

30. The computer-readable medium, as recited in claim 29, further comprising said nulling table, having a listing of nulls and optimizations compiled by said sorting means, represents signal gain and delay factors.

31. The computer-readable medium, as recited in claim 30, further comprising:

said nulled interference means calculates a signal level and an interferer level reduced below a total noise level;

said nulled interference means having power set to said total noise level because signals cannot be reduced below the noise floor; and said signal level and said interferer levels cannot be reduced by more than said maximum null depth.

32. The computer-readable medium, as recited in claim 31, further comprising:

said rank-ordering means disregarding a plurality of peaks which fall within boresight; and said rank ordering means, in constructing said nulling table, provides said sorted output in order of signal strength.

33. The computer-readable medium, as recited in claim 32, further comprising said adaptive antenna pattern output is provided for each of said receivers in a communications scenario.

34. The computer-readable medium, as recited in claim 32, further comprising:

said data output means is a printing means when the operator has selected said single antenna output pattern;

said printing means provides a printed report of a plurality of communications link status characteristics; and said data output means displays said adaptive antenna pattern output and said plurality of communications link status characteristics.

35. The computer-readable medium, as recited in claim 32, further comprising:

said link selection means permits the operator to select said single link mode of operation; and said link selection means permits the operator to select a multiple network link mode of operation.

* * * * *